United States Patent [19]
Hendrickson et al.

[11] 3,784,263
[45] Jan. 8, 1974

[54] SNOWMOBILE RUNNING FRAME AND TRACK CONTROL

[76] Inventors: G. Vernon Hendrickson; Kermit A. Hendrickson, both of c/o Hendrickson Snowmobile Sales, Lake Park, Minn.

[22] Filed: Nov. 17, 1972

[21] Appl. No.: 307,220

[52] U.S. Cl.................... 305/22, 180/5 R, 305/24
[51] Int. Cl............................................ B62m 27/02
[58] Field of Search .................. 180/5; 305/24, 22, 305/25, 27, 28

[56] References Cited
UNITED STATES PATENTS

| | | | |
|---|---|---|---|
| 3,701,394 | 10/1972 | Hendrickson | 180/5 R |
| 3,727,709 | 4/1973 | Newman | 180/5 R |
| 3,707,198 | 12/1972 | Pierson | 180/5 R |
| 3,719,242 | 3/1973 | Duclo | 180/5 R |
| 3,613,811 | 10/1971 | Brandli | 305/24 X |
| 3,446,303 | 5/1969 | Trapp | 305/22 X |

*Primary Examiner*—Richard J. Johnson
*Attorney*—James R. Cwayna

[57] ABSTRACT

A frame device for showmobiles and other track or belt driven vehicles which includes a first frame member attachable to the vehicle with a second lower frame section arranged for supporting the lower and particularly rear track supporting elements thereon which member is pivotally attached to the first frame member and upon such pivoting, a cam element pivotally supported between the first frame member and the second frame member drives the rear track supporting member rearwardly such that the rear track supporting member will maintain proper tension on the track. Spring loading arrangements are provided to normally keep this second supporting frame member in its normal ground contacting position.

8 Claims, 6 Drawing Figures

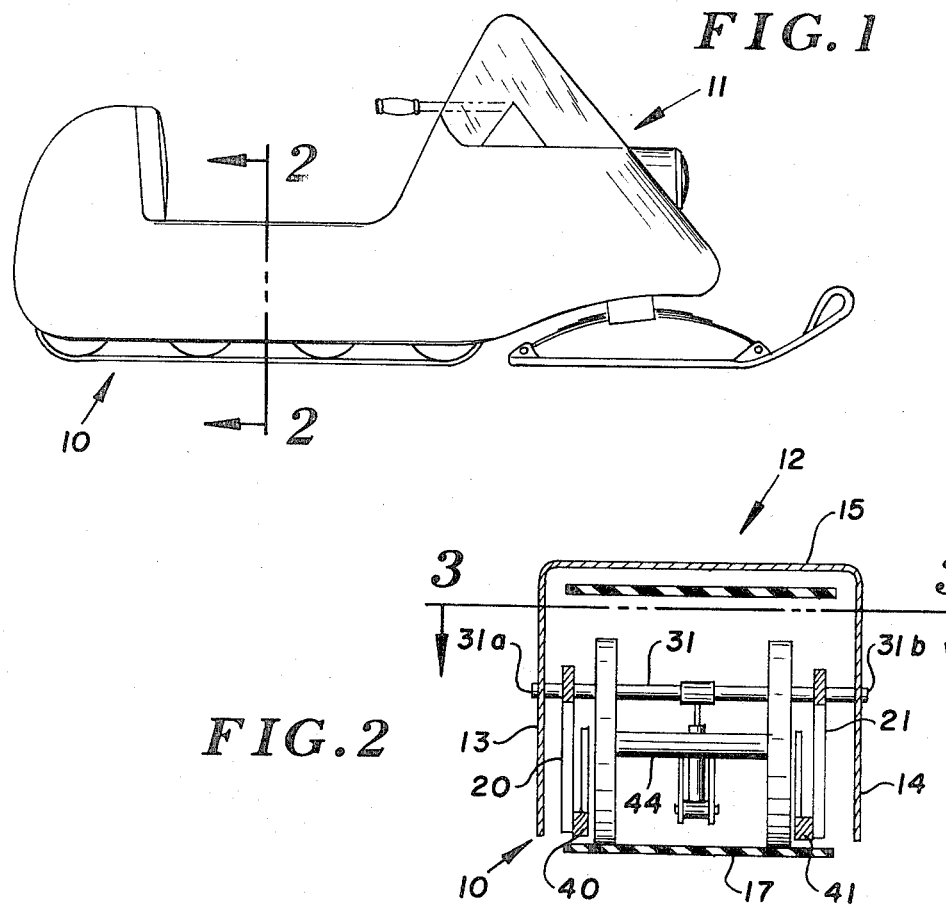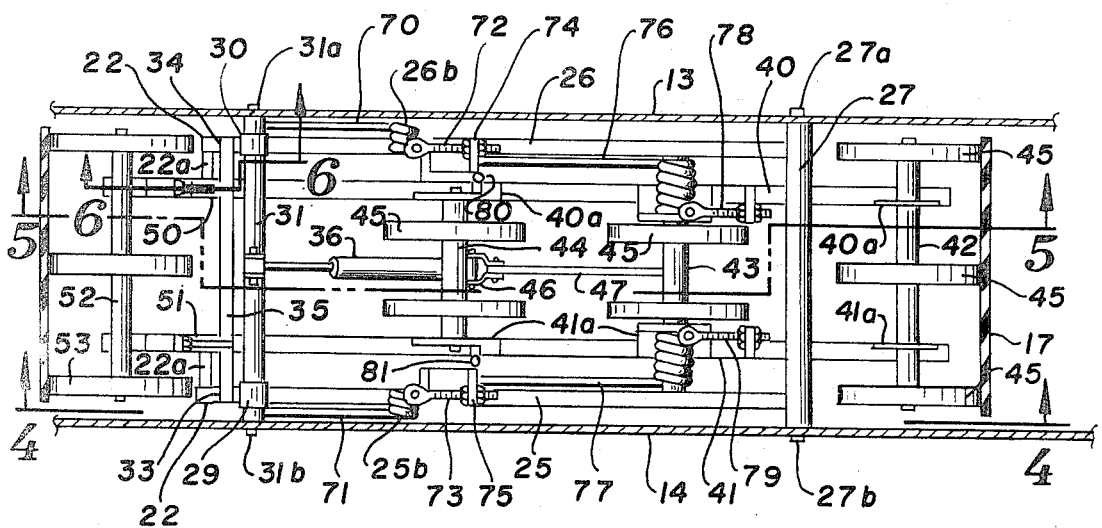

SNOWMOBILE RUNNING FRAME AND TRACK CONTROL

Various snowmobile belt and track driving support mechanisms have been provided since the advent of the snowmobile. The field of this invention relates to an improved system which includes means for insuring track or belt tension when the track and frame is moved upwardly and downwardly due to riding over bumpy ground. With applicant's device a unique camming mechanism is provided which will drive a rear track supporting member rearwardly to maintain the tension of the belt. With applicants' device further loading conditions are provided which will permit control of the degree of stiffness of the ride by providing a double spring arrangement between the machine and the floating track supporting framework.

With applicants' device, the unit is installed into the tunnel of a snowmobile and mounted therein in a stationary condition with a first stationary member and a floating portion thereof is free to oscillate into and out of the tunnel to provide a smooth ride. Upon such oscillation the distance around all of the pulleys and drive mechanisms will change and applicant has provided means for adjusting the length therebetween such that the belt will remain in its properly tensioned condition.

It is therefore an object of applicants' invention to provide a track supporting unit for snowmobiles or other tracked vehicles which includes means for automatically maintaining the tension on the belt or track.

It is a further object of applicants' invention to provide a new and unique frame structure which includes a support portions of a tracked vehicle such as a snowmobile and the like which will permit a certain shock absorbing quality for the unit and thus provide a smoother ride thereto.

It is still a further object of applicants' invention to provide a new and unique track tension maintaining device for tracked vehicles such as snowmobiles and the like which will also include means for adjusting the initial orientation of the track to the vehicle.

These and other objects and advantages of the invention will more fully appear from the following description made in connection with the accompanying drawings, wherein like reference characters refer to the same or similar parts throughout the several views and in which:

FIG. 1 is a side elevation of a typical snowmobile;

FIG. 2 is a vertical section taken substantially along Line 2—2 of FIG. 1;

FIG. 3 is a horizontal section taken substantially along Line 3—3 of FIG. 2 providing a top plan view of the frame embodying applicants' concepts;

Figure 4:
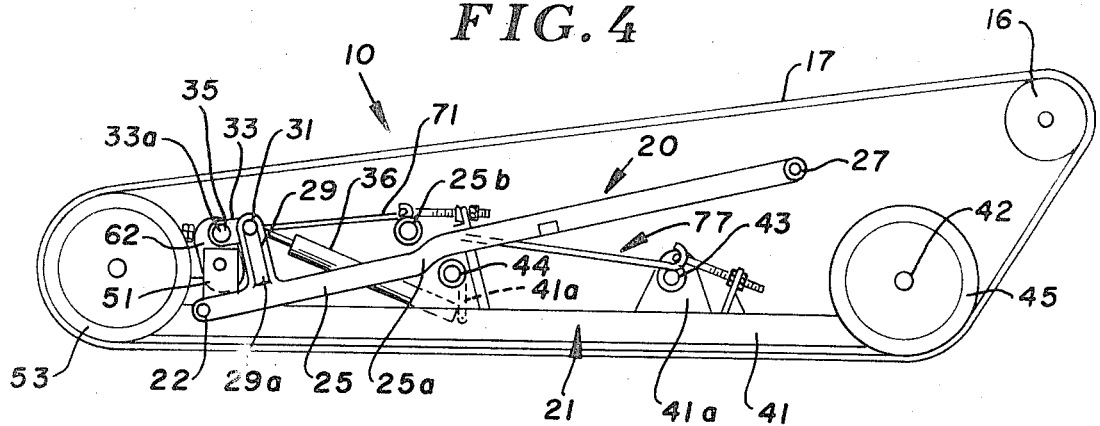
FIG. 4 is a vertical section taken substantially along Line 4—4 of FIG. 3.

In accordance with the accompanying drawings, applicants' track mounting unit is generally designated 10 and is illustrated mounted on a typical snowmobile structure 11 which snowmobile structure includes a tunnel or track mounting portion designated generally 12 which tunnel portion includes downwardly depending sides 13, 14 and a top cover member 15. The tunnel 12 extends the length of the vehicle and provides a housing arrangement for the track structure 10 of applicants' device and within this tunnel 12 is a drive sprocket 16 extending thereacross such that power may be delivered to the belt 17 of the unit 10. The drive sprocket delivers this power in and through various methods depending upon the particular belt 17 being utilized.

Applicants' frame structure basically has two individual frame elements, a first of which is designated 20 the second of which is designated 21. These two frame elements are pivotally attached to one another at a connection point 22 at the rear most portion thereof such that as will become obvious hereinafter the frontal portions are shiftable towards and away from each other.

Upper frame member 20 includes a pair of spaced side rail members 25, 26 having an intermediate bend portion 25a, 26a with a torsion spring retaining rod or bar 25b, 26b arranged in this portion of the frame. These attachment points 22 provide a means for pivotally attaching the upper frame 20 to the lower frame 21 and pins or other rotative bearing connectors 22a are provided to maintain this rotative condition. A front cross member 27 is provided to join the forward most end of the frame 20 and extends outwardly therefrom to provide a connection means such as at 27a, 27b to permit this end of the frame 20 to be rigidly attached to the side members 13, 14 of the tunnel. Arranged at the rear most ends of the frame element 25, 26 are a pair of upstanding yokes 29, 30 and a second bar member 31 is provided therethrough with stop elements such as washers on either side of the yokes 29, 30 to maintain this bar 31 and thus the upper frame elements 25, 26 in proper position laterally within the tunnel 12. Arranged at the ends of this bar 31, connection means 31a, 31b are provided to permit the same to be positively attached to the side walls 13, 14 of the tunnel 12. Arranged directly behind this pair of yokes 29, 30 are a pair of rearwardly extending ear members 33, 34 having passages 33a, 34a therethrough for holding and capturing a rod 35 therein. As particularly illustrated in FIG. 6 the yoke 29, 30 are provided with a slot 29a, 30a therein to permit movement of the rod 31 upwardly and downwardly therein and a hydraulic cushioning cylinder 36 is attached generally centrally thereof.

The lower frame element 21 consists of a pair of spaced lower frame elements 40, 41 extending longitudinally of the unit and obviously on the rear most portion thereof means are provided to attach these frame elements 40, 41 to the attachment portions 22, 22a of the upper frame. Arranged in spaced relationship along the frame elements 40, 41 are a plurality of brackets designated 40a—40a, 41a and in the form shown these brackets are provided spaced from the front of the frame sections 40, 41 and it should be noted that certain of these brackets may be mounted either on the mid points of the frame sections 40, 41 or they may be mounted interiorly thereof as particularly illustrated for the set of intermediate brackets 40a—40a. As illustrated, axles 42, 43, 44 are mounted in said brackets and these axles provide the spacing for and holding of the frame elements 40, 41 in their proper relation to each other.

As illustrated in the view of FIG. 3 three wheel members 45 are arranged on the first such axle 42 and in this situation one of the wheels is intermediate frame sections 40, 41 while the remaining wheels are exterior thereof. On the intermediate axle 43 and the rear axle 44 the wheels 45 are mounted interiorly of the frame members 40, 41. It should be noted that the clearance of the bogie wheels below the bottom of the frame members 40, 41 is sufficiently close and elements that are known in the industry as slides could be mounted below the frame members such that a combination of wheels and slide suspensions for the belt could be provided.

As previously stated, a hydraulic cylinder 36 is provided on the rear connecting bar 31 and frame work 46 is provided on the axle 44 such that the same may be attached thereto. A supporting brace 47 extends angularly upwardly from this frame member 46 to be affixed to the intermediate axle 43 for added bracing thereof.

Figure 6:
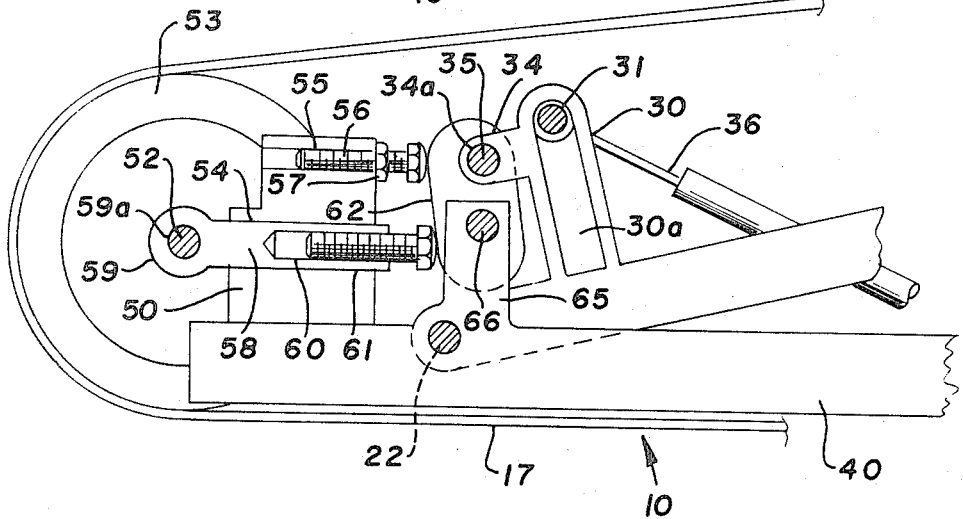
FIG. 6 is a vertical section taken substantially along Line 6—6 of FIG. 3 and being drawn to an enlarged scale.

Arranged on the rear most ends of the side frames 40, 41 are a pair of upstanding support members 50, 51 and for simplicity of this description applicant will discuss the view of FIG. 6 which is drawn to an enlarged scale and it should be obvious that this same structure exists on the ends of both of the frame members 40, 41 as it is necessary to provide this structure on both of the frame members such that the rear axle member 52 which supports rear wheels 53 will be hled in aligned relation to positively control the rear portion of the belt as the same circles about the wheels 53.

As illustrated in FIG. 6 this upstanding block provides a pair of passages 54, 55 therethrough the upper one 55 of which is threaded and which is designed to receive a captured and adjusting nut and bolt arrangement wherein a first bolt 56 may be inserted into the passage 55 and a jam nut 57 used to positively lock the same therein. The purpose of this particular arrangement is to provide and control an initial setting for the unit as this bolt 56 abuts with a pair of connective links 62 arranged between the upper frame 20 and lower frame 21. Arranged in the second passage 54 is a first trunion member 58 having a rearwardly extending end 59 having a passage 59a therethrough to receive the axle 52 and which entire member 58 is slideable within the passage 54 such that the location of the rear wheel may be altered in accordance with the movement of the lower frame 21 with respect to the upper frame 20. Again this member 58 is provided with a threaded passage 60 having a bolt member 61 received therein which bolt member again is positioned in relation to the aforementioned link 62 such that as the frames are shifted this link will be shifted and will force the axle holding member 58 rearwardly whenever the front most portions of the frame members are brought into closer proximity thus maintaining the tension on the drive belt 17. It should be obvious that whenever the snowmobile goes overa bump that the front most portion of the lower frame 21 will be driven upwardly into the tunnel and thus the total dimension about the front wheels 45, the rear wheels 53 and the drive sprocket 16 will be changed and by shifting the rear wheel backwardly or over a rearwardly the tension will be maintained on the belt.

As illustrated, an upstanding leg 65 is provided on each of the rearmost portions of the frame sections 40, 41 and attached for pivotal movement thereon through a pin 66 is the connective link 62. This connective link 62 extends between this up standing leg member 65 to the afore mentioned shaft 35 carried in the ear 34 of the upper frame member 20. In this manner then a connective pivotal arrangement is provided between the upper and lower frames which link is arranged in alignment with the adjustment bolt 56 and the moveable rear wheel control element 58.

Figure 5:
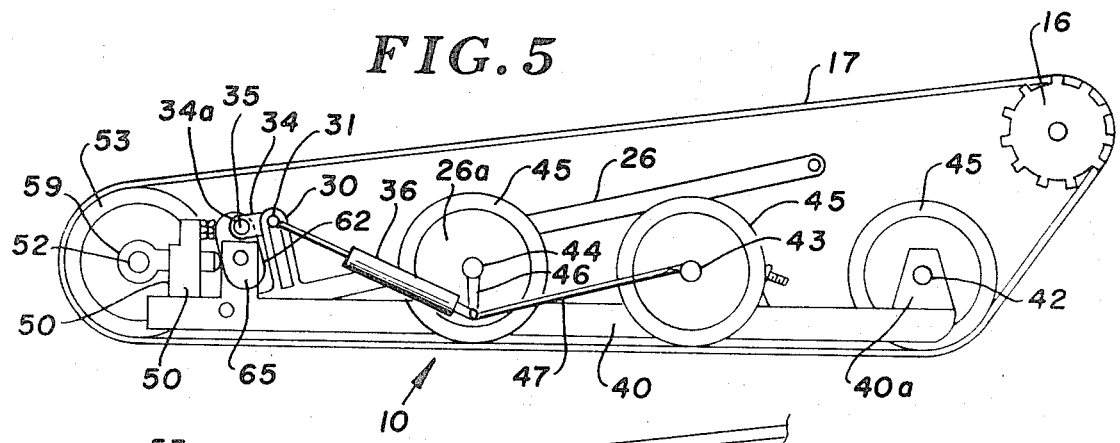
FIG. 5 is a vertical section taken substantially along Line 5—5 of FIG. 3.

Basically the concept of this rear link assembly is to maintain the tension on the belt 17 and this is obviously done through utilization of both of the adjustment members. The initial tensioning of the belt 17 is maintained by adjustment of the screw member or bolt member 56. This adjustment will, when considering FIGS. 4 and 5, increase the spacing between the forward most ends of the frame sections 20, 21. After such adjustment has been accomplished the proper setting of the adjustment bolt 61 will provide rearward movement of the rear wheels whenever the frame portions are brought closer together at the forward most end thereof. This movement is accomplished by the lower frame pivoting about the connective point 22 and thereby forcing the lower most portion of the connective link 62 rearwardly against the bolt member 61 which will then force the rear wheel rearwardly. As will be discussed hereinafter springs are provided between the two frames and these will cause the same to be brought back into their normal spaced apart position and at that point the tension of the belt 17 will draw the rear wheel inwardly.

As illustrated in FIG. 3, a plurality of torsion spring members are provided. A first pair of these spring members 70, 71 are provided to contact the outwardly extending portion of the first mentioned connective support rod 31 and are mounted with their torsion portion around the extending bar members 25b, 26b which are provided on the upper frame at the off set portion thereof. These spring member 70, 71 terminate in hooks permitting the connection thereto of an adjustable link member 72, 73 which extends through an upwardly extending brace 74, 75 with of course capturing nuts or other threaded fasteners being provided thereagainst. This first spring arrangement then provides a means of spring loading the upper frame 20 to a portion of the unit actually connected to the tunnel and therefore this frame member is actually spring loaded onto the snowmobile tunnel.

Spring loading between the upper and lower frame is accomplished through a second spring structure 76, 77 which has a first portion extending under the afore mentioned brackets 74, 75 and which have their torsion portions arranged about the extending ends of the intermediate axle 43. Again these spring elements are provided with a hook on the end thereof and an adjustment member and bracket 78, 79 is provided on the lower frame such that the spring tension may be increased. As is also illustrated in FIG. 3, a pair of guide members 80, 81 are provided as for example on the upstanding brackets 40a, 41a of the lower frame to provide a vertical guide as the two frame members are moved in vertical relation to one another.

With applicants' arrangement then it should be obvious that a means for maintaining tension on the driving belt of the snowmobile is provided at all times through the take up mechanism of rearward movement of the rear set of wheels controlling and contacting the belt. As the track frame sections are brought together due to riding over rough terrain, a lower frame member will pivot about the upper frame member thus causing a floating back wheel assembly to be forced rearwardly thus maintaining the proper tension on the belt. This system also provides for initial rapid adjustment of the track tension as it is only necessary to set a first pair of adjustment members to place the rear wheel in its proper belt tightening and tensioning position. It should be obvious that applicant has provided a unique means for obtaining and maintaining proper belt tension on various belted or tracked members such as snowmobiles or the like.

We claim:

1. A frame and track tension control for track driven vehicles such as a snowmobile including;
   a. a first frame member having a pair of spaced apart, longitudinally extending frame members;
   b. means for securing said first frame member to the vehicle;
   c. a second longitudinally extending frame member pivotally connected to said first frame member adjacent the rear portions thereof;
   d. a plurality of track engaging wheel sets carried by said second frame member;
   e. one of said wheel sets arranged adjacent the rear of said second frame member and being longitudinally shiftably mounted thereon; and,
   f. means actuated by said second frame member to urge said one of said wheel sets rearwardly when said second frame is pivotally shifted toward said first frame member.

2. The structure set forth in claim 1 and said actuating means including at least one connective link extending between said first and second frame member and mounted for rotation about a portion of said first frame member and actuated by pivotal shifting of said second frame member.

3. The structure set forth in claim 1 and means for initially positioning the forward end of said second frame with respect to said first frame.

4. The structure set forth in claim 3 and biasing means for returning said second frame to its initial position.

5. The structure set forth in claim 1 and means for guiding said second frame with respect to said said first frame when the same is pivotally shifted towards said second frame.

6. The structure set forth in claim 1 and
   a. said one of said wheel sets being carried by an axle member extending across said second frame; and,
   b. said actuating means arranged and constructed to urge said axle rearwardly.

7. The structure set forth in claim 6 and said actuating means including a pair of connective links extending between said first and second frame members and mounted for rotation about a portion of said first frame member and actuated to shift said axle rearwardly by pivotal shifting of said second frame member.

8. The structure set forth in claim 1 and cushioning means arranged between said first and second frame member.

* * * * *